COMBINED AMPLITUDE AND FREQUENCY DISCRIMINATORY AUTOMATIC GAIN CONTROL

Filed Dec. 1, 1948 3 Sheets-Sheet 1

INVENTOR
Alda V. Bedford
BY
[signature]
ATTORNEY

Feb. 19, 1952 A. V. BEDFORD 2,586,760

COMBINED AMPLITUDE AND FREQUENCY DISCRIMINATORY AUTOMATIC GAIN CONTROL

Filed Dec. 1, 1948 3 Sheets-Sheet 2

INVENTOR
Alda V. Bedford
BY
[signature]
ATTORNEY

INVENTOR
Alda V. Bedford
BY
Paul A. Mitchell
ATTORNEY

Patented Feb. 19, 1952 2,586,760

UNITED STATES PATENT OFFICE 2,586,760

COMBINED AMPLITUDE AND FREQUENCY DISCRIMINATORY AUTOMATIC GAIN CONTROL

Alda V. Bedford, Princeton, N. J., assignor to Radio Corporation of America, a corporation of Delaware Application December 1, 1948, Serial No. 62,863

7 Claims. (Cl. 178—7.3)

The present invention relates to automatic gain control systems for radio receiving systems and pertains more directly, although not necessarily limited thereto, to automatic gain control circuits for use in radio receiving systems adapted to receive and demodulate a radio carrier modulated by a composite wave including a periodically recurrent synchronizing component representing a fixed percentage of radio carrier modulation.

In more particularity, the present invention deals with a new and improved form of automatic gain control system for television receivers, which through the novel utilization of amplitude discriminatory wave communication circuits in combination with frequency discriminatory circuits responsive only to harmonics of the received television sync pulse repetition rate, acts to develop a receiver gain control voltage virtually free from noise effects and with sufficient accuracy to maintain the peak amplitude of the demodulated composite television signal substantially constant for large variations in television receiver input signal.

It is commonly known that automatic gain control circuits for use in television receiving equipment differ greatly from the more frequently encountered automatic gain control circuits embodied in receivers for sound broadcast signals. In the instance of the usual broadcast receiver for receiving amplitude modulated carriers, it is considered adequate that the automatic gain control potential be produced by electrical information gleaned from the average carrier intensity of the received radio signal. Such an automatic gain control circuit would not, however, be satisfactory for controlling the gain of television receiver amplifier channels as the average signal strength of the television radio frequency carrier is normally a function of the average image or picture brilliance, sometimes referred to as "background level." Development of automatic gain control voltage in accordance with the average signal strength of the received radio carrier would then cause the gain to be altered not only in accordance with the signal intensity variations of the radio carrier due to undesirable fading or other atmospheric phenomenon but also in accordance with the average picture brilliance of the image being transmitted.

Radio transmitted "negative modulated" television signals (as is the practice in the United States) normally include blanking pulses or black level information which is transmitted between each image line in combination with the line synchronizing pulse. This line sync pulse is most commonly superimposed upon the black level signals and these data are transmitted at some respectively constant but different carrier levels. In common television practice, the sync pulse is transmitted at what may be termed full carrier intensity or 100% carrier amplitude, while the black level or blank out pulse is transmitted at approximately 75% of the full carrier amplitude. It has been the general practice in some television receivers design to utilize a form of a peak rectifier AGC system which responds to those peak pulses of energy represented by the blanking and synchronizing signals during the synchronizing intervals. By this means, there is then developed an automatic gain control potential for desirably altering the gain of the receiver in accordance with the peak signal strength received during the synchronizing intervals. An automatic gain control system of this type is satisfactory to a degree, so long as extraneous signals are not received with sufficient intensity to cause the peak rectifier system to respond excessively to this undesirable extraneous signal energy. If, however, the extraneous noise signal is present during the synchronizing interval, the energy represented by the noise will cause the peak detector to produce an abnormal increase in rectified energy and therefore produce an abnormal increase in the automatic gain control potential which in turn results in a generally undesirable reduction of the receiver sensitivity following such noise. This, of course, interferes with the proper operation of the receiver and not only produces fluctuations of the reproduced image brightness but may result in tearing out or other destructive disturbances in the image raster during periods directly following such noise bursts, in which due to the reduced receiver gain, inadequate synchronizing information is applied to the synchronizing circuits. Furthermore, in such systems, the automatic gain control potential that is developed by each successive sync peak is generally stored on a condenser or applied to a circuit having a time constant such that the automatic gain control potential may for all practical purposes be maintained constant throughout one or more successive line intervals. Due to the very presence of this time constant, such a circuit usually responds rapidly to high intensity noise pulses but does not allow the receiver to recover as quickly from the effects of noise as the receiver responds initially to noise.

The present invention overcomes in the most part the above disadvantages by means of a simple and novel circuit which extracts, from the demodulated composite video signal, signal energy appearing between two fixed datum amplitude levels and applies the energy so obtained to the excitation of a resonant circuit tuned to a harmonic of the horizontal sync pulse repetition rate such that the harmonic voltage developed across the resonant circuit may in turn be peak detected to develop a substantially noise-free automatic gain control voltage which accurately follows even the more rapid changes in carrier intensity.

It is therefore one purpose of the present invention to provide an improved form of automatic gain control circuit which exhibits an extraordinary degree of noise immunity.

It is another object of the present invention to provide an automatic gain control circuit which selectively responds to different aspects of a received signal.

It is still another object of the present invention to provide an automatic gain control system, particularly suited for application in television receiving systems, which extracts amplitude control information from the received television signal on a frequency discriminative basis whereby control of the receiver gain is virtually free of noise effects.

It is further an object of the present invention to provide a fast-acting automatic gain control system for television receiving circuits.

It is another purpose of the present invention to provide a simple and economical system of automatic gain control operation, which requires a minimum of apparatus and successfully achieves all of the previous objects set forth hereinabove.

The invention possesses numerous other objects and features of advantage some of which together with the foregoing will be set forth in the following description of specific apparatus embodying and utilizing its novel method. It is therefore to be understood that the present invention is applicable to other apparatus and that its use is in no way intended to be limited to the apparatus shown in the drawings as other advantageous embodiments of the present invention as set forth and defined in the appended claims will occur to those skilled in the art after having benefited from the teachings of the following description taken in connection with the accompanying drawings in which:

Figures 1, 2:
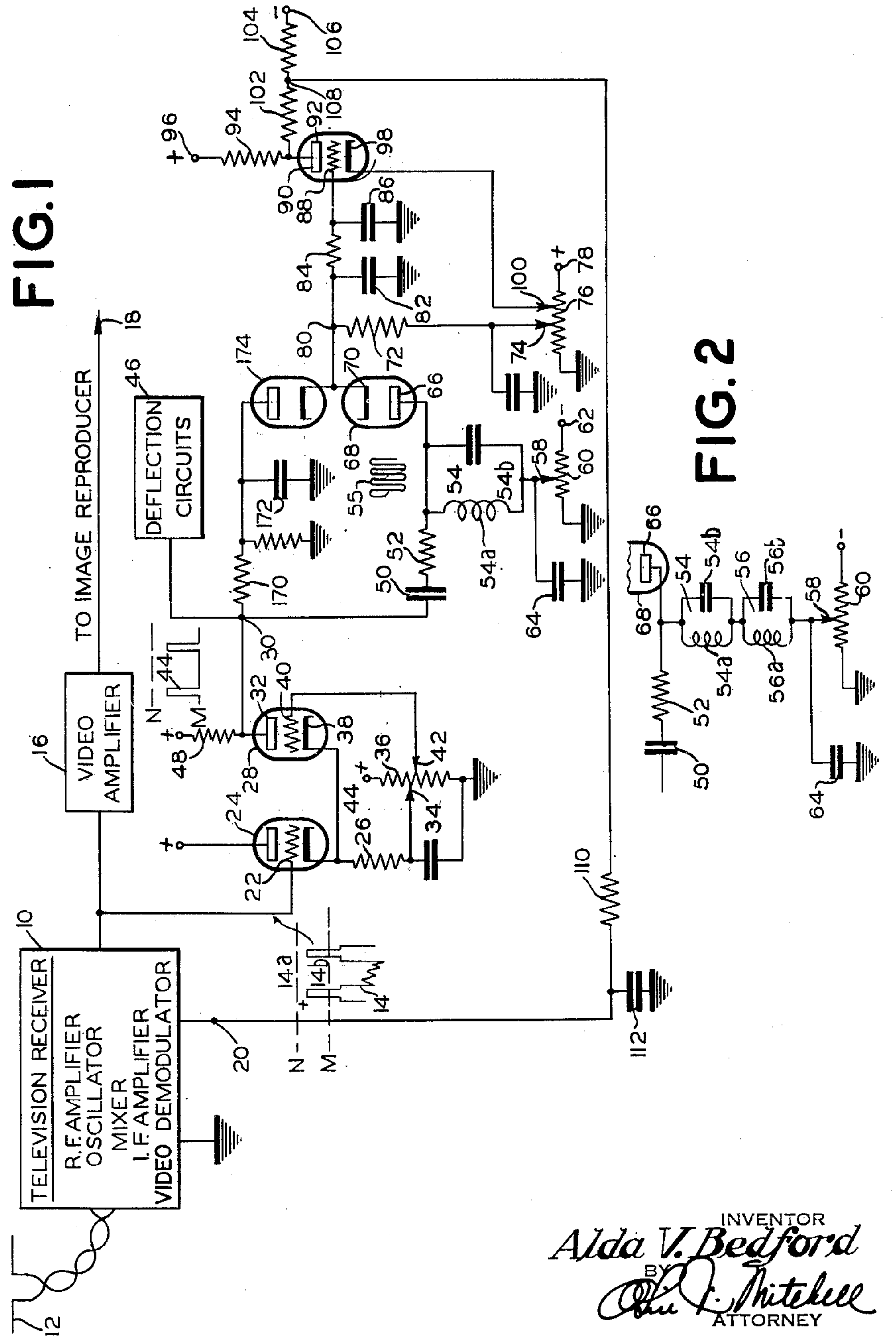
Figure 1 shows one form of the present invention as applied to a television receiving system.
Figure 2 illustrates a modification of a specific aspect of the present invention as illustrated in Figure 1.

Referring now to Figure 1, there is represented in block form at 10, the typical components of a conventional television receiver comprising an R. F. amplifier, an oscillator, a mixer, an I. F. amplifier, and a video demodulator, input radio frequency signal to the R. F. amplifier being provided by antenna 12. The composite video signal shown at 14 as demodulated from the radio carrier is then applied to video amplifier 16, the output of which is supplied to some form of image reproducer as indicated by arrow 18. A terminal 20 is available on the receiver 10 to which may be applied a unidirectional voltage for controlling the gain of the television receiver in accordance with the magnitude of the voltage so applied. This terminal corresponds to the well-known AGC or AVC bus in radio receiving systems and the possible connections of it with the components of the receiver to achieve this voltage sensitive gain control action are well-known to the art and need not here be dwelt upon.

The demodulated video signal 14 is also applied to the grid 22 of vacuum tube 24 which is cathode coupled by means of cathode resistor 26 to the vacuum tube 28. According to the present invention, the vacuum tubes 24 and 28, connected as shown, operate as a well known form of D. C. coupled sync clipper and limiter amplifier stage for the incoming video signal 14. The D. C. information derived from the video demodulator in block 10 is then maintained through to the clipper-limiter output terminal 30 connected with the anode 32 of the vacuum tube 28. Clipping action at the lower level M shown superimposed upon the waveform 14 is achieved by plate current cut-off in the vacuum tube 24 by returning the lower terminal of the cathode load resistor 26 to a source of positive D. C. potential available at tap 34 on bleeder resistor 36. The tap 34 is adjusted to bias the vacuum tube 24 sufficiently beyond plate current cut-off so that plate current conduction in tube 24 will be caused only by signals positively in excess of level M. Correspondingly, the limiting level N is established by vacuum tube 28 which has its cathode 38 directly connected to the cathode of vacuum tube 24. Input signals to vacuum tube 24 positively in excess of level M, such as the synchronizing portion 14*a* of composite signal 14, are therefore passed by vacuum tube 24 and cause the cathode 38 of vacuum tube 28 to be driven in a positive direction. Since the grid 40 of vacuum tube 28 is held at a fixed potential relative to ground by its connection to variable tap 42 on bleeder resistor 36, the positive excursion of the cathode 38 will cause a positively extending pulse 44 to appear across the anode load resistor 48 of the vacuum tube 28. This pulse 44 then represents the portion of the input wave above level M shown in connection with signal 14. If the input signal to the grid of tube 24 exceeds a certain positive value, the cathode 38 at tube 28 will become sufficiently positive with respect to the grid 40 that the tube 28 is cut off and hence establish the limiting action at level N for the clipper-limiter combination. It is clear therefore that the amplitude differential embraced by these two datum amplitude levels may be adjusted to the desired value by properly positioning the taps 34 and 42 on the bleeder resistor 36 connected to the positive potential source 44.

For proper contrast in the reproduced television image, it is well-known that a certain "working" or normal value of input signal must be maintained to the input of video amplifier 16 which in turn will supply the reproducing device with a fixed peak-to-peak value of modulating voltage. Consequently, in using this clipper-limiter circuit in accordance with the present invention, the two datum amplitude levels M and N are established relative to this working amplitude of the composite input signal 14 such that clipping datum level M is above the blank-out pedestal level 14*b* of the video signal whereas the upper datum amplitude or limiting level N is substantially above the topmost extent or peak of sync represented at 14a. Therefore, provided the gain of the receiver 10 is adjusted to compensate for changes in signal strength picked up by antenna 12 and thereby maintain the amplitude of the demodulated wave 14 substantially at the working value, the pulses 44 available at terminal 30 of the clipper-limiter circuit will be suitable for the timing of the horizontal and vertical deflection circuits represented by block 46. As will be seen as the specification proceeds, the information extracted from the composite signal 14 between the datum amplitude levels M and N will be treated in a novel manner to derive a correcting potential for application to terminal 20 of the receiver 10 such to maintain the amplitude of the demodulated signal 14 at a substantially constant relationship with respect to the levels M and N and hence maintain the aforesaid proper clipping of synchronizing information for the deflection circuits 46 as well as a constant signal input to the video amplifier 16.

This automatic gain control action, in conjunction with the particular embodiment shown in Figure 1 will now be described. Information between levels M and N available at terminal 30 is coupled through capacitor 50 and series resistor 52 to a tuned circuit 54 which is made resonant at a harmonic of the sync pulse 14a repetition rate. By way of example of one mode of operation, it shall be hereinafter assumed that the resonant circuit 54 is tuned to 63,000 C. P. S. which is a fourth harmonic of the normal 15,750 horizontal sync pulse repetition rate. The lower end of the tuned circuit 54 is connected to adjustable tap 58 on bleeder resistor 60 which in turn is connected from negative power supply terminal 62 to ground. A suitable by-pass condenser 64 is shown connected from the tap 58 with ground to establish the terminal 58 at substantially A. C. ground potential. The upper terminal of tuned circuit 54 is connected with the anode 66 of a rectifier diode 68 having its cathode 70 connected through load resistor 72 to a positive potential available at an adjustable bleeder tap 74.

Thus, the pulses 44 corresponding to the synchronizing pulses 14a will ring the resonant circuit 54 to produce a 63,000 C. P. S. alternating voltage from the anode 66 to ground. Accordingly, the amplitude of this alternating voltage will be a positive function of the extent to which the synchronizing pulse 14a extends above the lower datum or clipping level M. The tap 74 on the bleeder resistor 76 connected with a positive source of potential and a terminal at 78 may then be adjusted to allow conduction of the diode 68 for all amplitudes of resonant circuit voltage in excess of a given threshhold value, the magnitude of this threshhold value being determined by the difference between the voltage at terminal 58 and terminal 74. As in all AGC systems this threshhold is, for all practical purposes, set to permit diode conduction for all values of signal in excess of the "working" value hereinbefore described. Voltage amplitudes across the resonant circuit 54 in excess of this threshhold value are thereby rectified by the diode 68 to produce a positive unidirectional potential at the cathode terminal 80 of the load resistor 72. This unidirectional potential appearing at 80 is then filtered by means of the RC network comprising capacitor 82, resistor 84, and capacitor 86 for application to the control grid 88 of a D. C. amplifier 90. The anode 92 of the vacuum tube 90 is supplied with polarizing potential through load resistor 94 from positive power supply terminal 96. As shown, the cathode 98 of the vacuum tube 90 is returned to an adjustable tap 100 on the bleeder resistor 76 so that the cathode 98 may be operated at a positive potential with respect to the grid 88. The anode 92 is further connected to a bleeder resistor combination comprising resistor 102 and 104 connected with a source of negative potential 106. Thus the voltage appearing at terminal 108 at the junction of the resistors 102 and 104 may be negative with respect to ground but still vary in accordance with the potential appearing on the anode 92 which in the present embodiment would be positive with respect to ground.

In the action of the circuit a small increase of say one percent due to radio carrier fading, of the peak amplitude of signal 14 will increase the extent to which sync pulse 14a extends above level M and hence increase the amount of energy applied for ringing of tuned circuit 54 by a greater percentage, say 5 percent. This 5 percent increase in the amplitude of 63,000 cycle signal appearing across the tuned circuit 54 will cause a still greater increase (say 100 percent) in the control voltage appearing at terminal 80 due to rectification of tuned circuit voltage exceeding the D. C. threshhold bias voltage on the diode 68. This increase in positive voltage at terminal 80 will in turn increase the plate current through the amplifier 90 and cause the negative terminal 108 to become more negative. Since terminal 108 is connected through the time constant network comprising resistor 110 and capacitor 112 to the AGC bus terminal 20, the increase in negative voltage of terminal 108 will act to decrease the gain of the television receiver 10 and upon proper adjustment of circuit values, the received signal 14 will remain substantially constant for a considerable range of input signal variations to the television receiver. On the other hand, should the signal amplitude 14 tend to decrease, the amount of signal appearing above level M will decrease thereby supplying less energy to tuned circuit 54 and decreasing the amplitude of the alternating voltage appearing thereacross. This will be reflected in a decreased positive potential at terminal 80 which in turn will cause the AGC bus voltage extracted from terminal 108 to become less negative and hence tend to increase the gain of the receiver to counteract the decrease in the signal 14.

Figure 3:
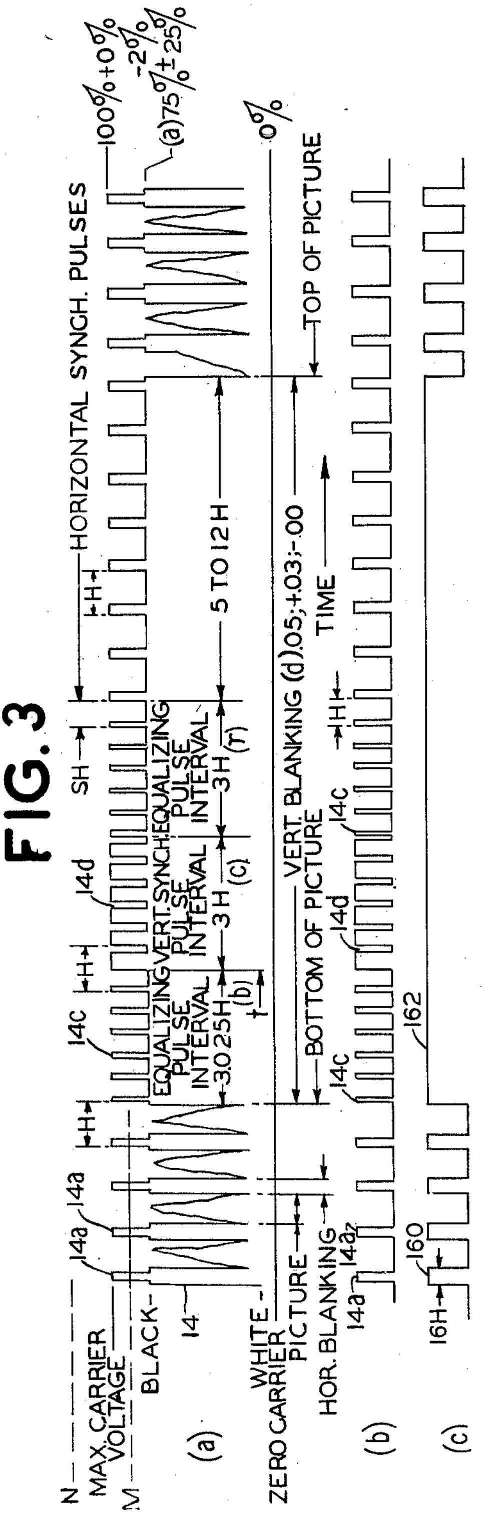
Figure 3 illustrates characteristics of a standard composite television signal.
Figure 4:
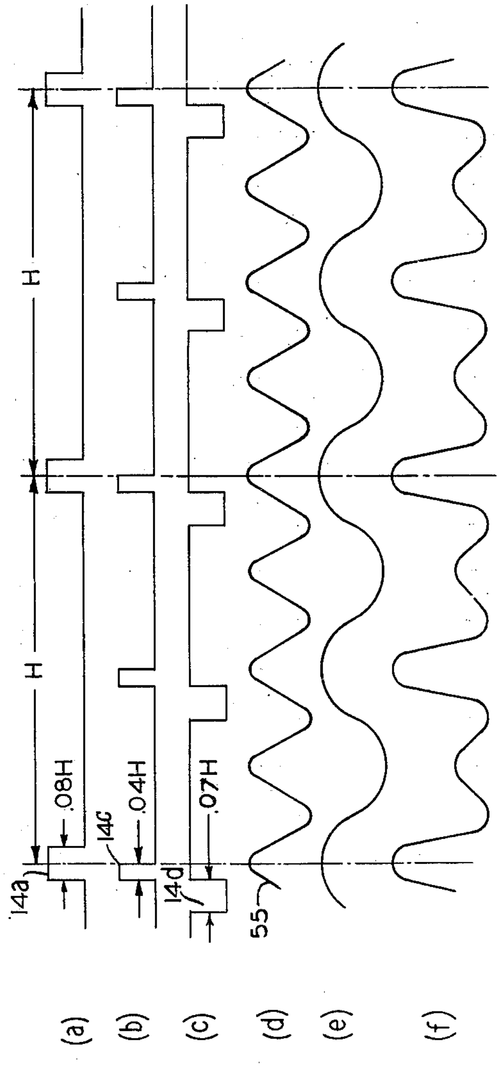
Figure 4 illustrates certain waveforms which may be developed and utilized in the practice of the present invention.

Since the Q of the tuned circuit 54 may be made quite high (typical operating Q values may be in the range of Q=200), it follows that the noise immunity of the AGC circuit is inherently high. Referring to Figure 3 which illustrates the present-day standard synthesis of a commercial broadcast television signal having superimposed upon it by dotted lines the respective datum amplitude clipping and limiting levels M and N, it can be seen that the pulses extracted from the composite wave signal 14 between the levels M and N, although being of equal amplitude for a constant amplitude of input waveform 14, are not all of equal width. For the condition of circuit operation depicted in Figure 1 (which is represented by levels M and N superimposed upon wave 14 in Figure 3A) the pulses appearing at terminal 30 of Figure 1 will appear substantially as shown in Figure 3B. This, of course, corresponds with those portions of the waveform 14 (Figure 3A) extending above clipping level M. Thus, it appears that the horizontal synchronizing pulses 14a at the bottom of the picture are followed during the vertical blanking interval by a series of six equalizing pulses such as 14c, a vertical sync pulse having six serrations such as 14d to in turn be followed by six more equalizing pulses. The relative and respective timing of these pulses is more clearly shown by the curves 4a, 4b, and 4c in Figure 4.

From the relative timing and width of the pulse information depicted by these curves, it can be shown that the amplitude of the 63,000 C. P. S. wave 55 in Figure 4D appearing across the tuned circuit 54 will remain substantially constant for a given amplitude of input signal regardless of the difference in pulse widths applied thereto during the vertical blanking period. More specifically, let the equalizing pulse interval be considered wherein the equalizing pulses 14c are half the width (.04H) of the horizontal synchronizing pulses 14a (.08H). Since the phase of the 63,000 cycle component of the equalizing pulses as shown in 4b differs by only about 150 degrees from the corresponding component produced by the horizontal synchronizing pulses 14a and since the same amount of energy is represented by the equalizing pulses due to their half width and double frequency recurrence, the high fly wheel effect of the tuned circuit will permit a negligible change in the amplitude of the voltage developed thereby. The vertical sync pulse interval wave 4c having serrations 14d equal to .07H, contains nearly twice as much 63,000 cycle component as the horizontal synchronizing pulses themselves, and the phase of this component during the vertical sync pulses is about 60° from that obtained from the horizontal sync pulses. This would indicate that during the vertical sync pulse itself considerable discontinuity could be expected in the waveform 55 appearing across the tuned circuit 54. However, the duration of the vertical sync pulse is equivalent to only 3 horizontal line intervals, which corresponds to approximately .00019 second out of each $^1/_{60}$ of a second, or about 1.1% of one vertical scan period. So again, if the Q of the tuned circuit is fairly high, the amplitude of the 63,000 cycle wave applied to the diode 68 will not have sufficient time to change appreciably due to the additional energy applied to the circuit during the vertical sync pulse. Furthermore, the difference in the phase of the excitation energy provided by the serrations in the vertical sync pulse relative to the horizontal synchronizing pulses will tend to minimize the increase of the voltage appearing across the tuned circuit due to this additional energy supplied during the vertical sync pulse interval.

In summary, it may be then concluded that for a constant value of input signal to the receiver, the voltage delivered to the diode 68 by the tuned circuit will remain virtually constant. This effect obviously permits a much more rapid AGC action to be obtained since the time constant associated with the load circuit of the diode 68 need not be made great enough to effectively swamp out any regularly recurrent discontinuity in the tuned circuit voltage due to the vertical blanking or sync interval.

Figure 5:
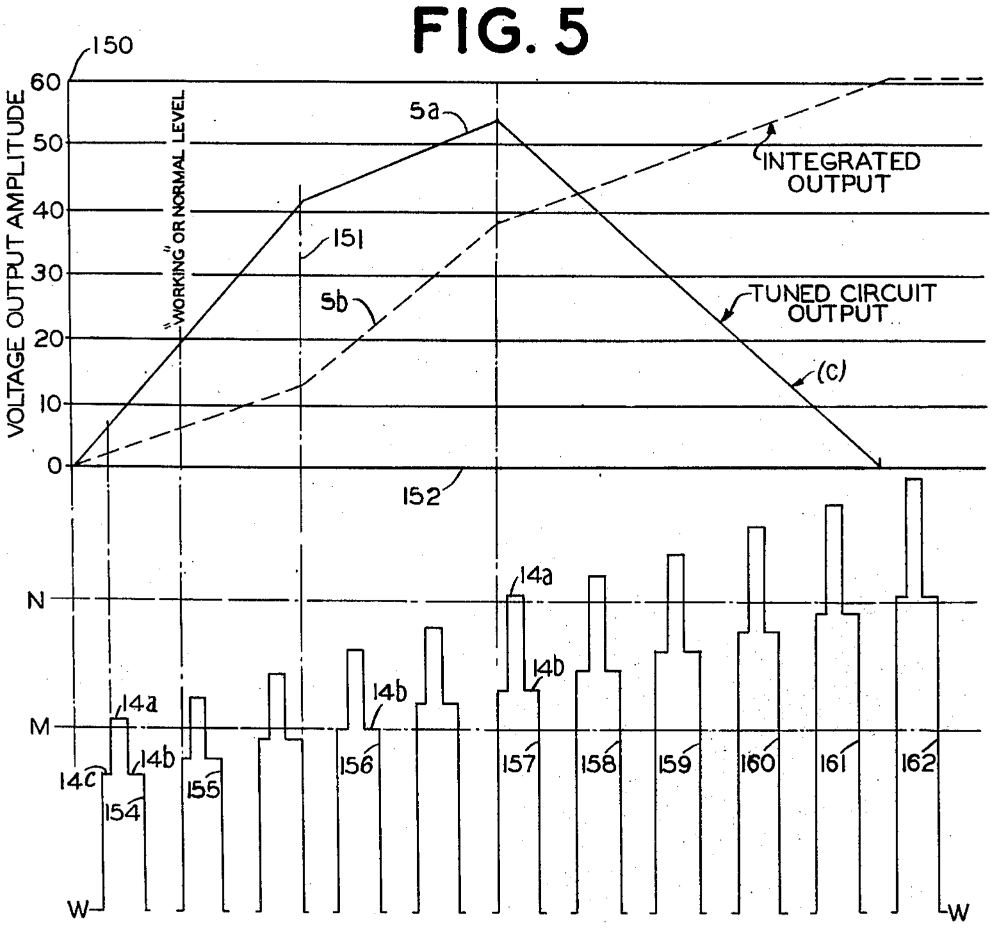
Figure 5 is a graphical presentation of certain operational characteristics of one portion of the present invention.

Observing now in more detail the character of the D. C. voltage change at terminal 80 with respect to changes in signal amplitude, use will be made of the graphical representation in Figure 5. The peak voltage output available at terminal 80 to a relative scale is depicted by ordinate 150. The curve 5a then shows developed voltage at terminal 80 for various values of signal input represented by the signal waveforms 14 (in relationship to the fixed datum amplitude levels M and N) along the abscissa 152. For purposes of a more explicit exemplary discussion with reference to this representation, it shall be assumed that no conduction threshhold is established for the diode 68 so that zero voltage will be developed for all signal strengths less than that requisite to establish the peak of sync 14a above the clipping level M. Accordingly, for an amplitude such as 154 (along abscissa 152) where the peak of sync 14a above the level M, the voltage developed may be arbitrarily and relatively represented as having a value of 5 along ordinate 150. This, of course, would represent an amplitude of video signal strength less than the desired working value illustrated and discussed in reference to Figure 1. For ease in comparing circuit action to the standard "working" signal condition of Figure 1, this desired "working" or normal level of signal is represented in Figure 5 at 155 and is shown to produce a normal output level at terminal 80 of 23. It can be seen that as the signal amplitude is increased to the point where the black level or pedestal 14b rises above the clipping level M, the voltage rise at terminal 80 is substantially linear with respect to increase in signal.

Once the signal amplitude is increased to the point where the black level 14b is above the threshhold level M, as depicted at 156, the rise in output voltage at terminal 80 with respect to an increase in signal intensity continues to be linear, but the rate of rise is somewhat reduced. This transition point from the rapid rate of rise to the reduced rate of rise is indicated by dashed line 151. The reason for this reduction in rate of voltage is that the portion of the composite signal below the black level 14b (this portion normally including picture signal information) will not necessarily contain any of the utilized 63,000 cycle component. Thus, increase in ringing amplitude will, to all intents, come about only by an increase in the absolute value of the peak of sync 14a above the black level 14b as the signal amplitude increases. For signals ranging up to the point where the top of sync 14a reaches the limiting value N as shown for the condition at 157, this less rapid rise continues. From this point on, however, since the synchronizing signal 14a is the only dependable source of 63,000-cycle component energy for the tuned circuit 54, further increase in signal strength, shown by successive positions 158, 159, 160, 161, and 162 up to the point where black level 14b reaches the limiting level N, results in a linear decrease in voltage at terminal 80. For the condition 162, it may be assumed that practically no 63,000-cycle component is supplied to the tuned circuit 54 although in practice, it is clear that some 63,000-cycle component may be obtained from picture information or composite pedestal structure. Inasmuch as the illustration in Figure 5 is intended to merely set forth the basic principles of operation, any residual excitation of the tuned circuit 54 for conditions of signal such as 162 may be properly neglected.

The low output of the tuned AGC system for signals in excess of a critical amplitude may under certain conditions cause undesirable compensatory action. For instance, if the signal intensity corresponding to the index 161 of Figure 5 were suddenly applied to the receiver 10, the control voltage developed at terminal 80 would be less than that corresponding to the threshhold level. Obviously, the receiver gain would increase in response for this excessively high signal instead of decrease, thereby producing improper automatic gain control operation. This inadequate response of the tuned AGC system over a limiting part of its operating range may in some instances be compensated for in part by proper design of time constant circuits throughout the receiver and AGC system or a special compensating circuit may be associated with the tuned AGC circuit to obviate the possibility of operation in this region of inadequate response.

Figure 6:
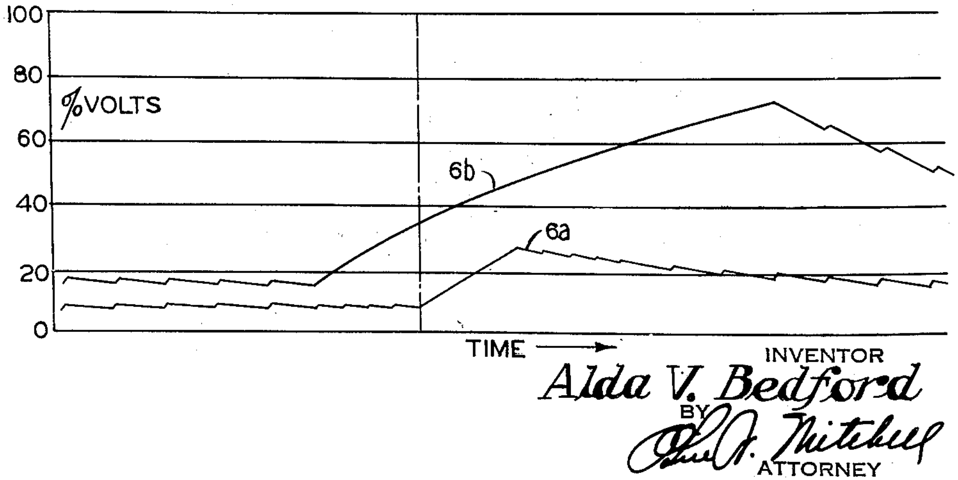
Figure 6 is a graphical presentation of other operational aspects of the present invention.

A specific form of protection against such undesirable operation is shown in Figure 1 and comprises application of the waveform at terminal 30 to an integrating circuit comprising resistor 170 and condenser 172 in combination with a rectifying circuit including diode 174. The operation of this auxiliary protective circuit is more fully described in a co-pending United States Patent application Serial No. 62,862, filed December 1, 1948, by Alda V. Bedford. This circuit without the tuned AGC circuit provides an AGC system which has certain disadvantages that the present invention overcomes. However, it may be employed herein as just suggested to provide a corrective influence for certain phases of operation of the present invention if such correction is deemed desirable in its practice. The protective influence acts substantially as follows:

The voltage waveform developed across capacitor 172 is the result of the integration of the energy communicated by the clipper-limiter circuit and applied to terminal 30. Accordingly, for normal operation corresponding to a clipper-limiter output such as 3*b*, the waveform developed across the capacitor 172 may be represented by curve 6*a* of Figure 6, having peak-to-peak value which is proportional to the relative amplitude of the received signal up to the point where the top of the blanking level 14*b* exceeds the clipping level M. For values of signal wherein the blanking level 14*b* reaches or exceeds the upper limiting level N, which corresponds to a clipper-limiter output signal as shown in 3*c*, the waveform developed across the integrating capacitor 172 will be substantially that shown in 6*b*. Accordingly, the output voltage across integrating capacitor 172 is then peak detected by diode 174 to develop a unidirectional potential across load resistor 72 which is proportional to the peak amplitude of the waveform resulting from integration. Neglecting the effects of the threshhold bias and the associated tuned AGC circuit, the output voltage developed at terminal 80 from the peak detection of the integrated wave would appear as curve 5*b* in Figure 5. This shows that as the input signal increases in amplitude, the integration output voltage developed across resistor 72 always increases and no reverse operating modes are observed at any point.

Looking now to the combined operation of both diodes 174 and 68 through the load resistor 72, it can be seen that the voltage developed across terminal 80 will be in response to only one of the diode circuits at a given time. That is to say, if the tuned AGC circuit is productive of a voltage across load resistor 72 in excess of that which would otherwise be produced by the peak detection of the integration wave appearing across capacitor 172, it is clear that the receiver gain control will be influenced solely by the tuned AGC circuit. However, should the tuned AGC circuit be forced into its high-input low-output mode of operation, the integrating circuit with its diode 174 may be adjusted to produce a potential in excess of the tuned circuit output and thereby establish control of the receiver gain. Hence, upon the sudden reception of an extremely strong signal such as 161 in Figure 5, the integrating circuit will produce a positive voltage of sufficient magnitude to reduce the gain of the receiver to a point where the output signal 14 is reduced sufficiently to allow the tuned AGC circuit to take over control of the receiver gain.

The arrangement of Figure 2 represents another form of tuned AGC system. Here a second parallel resonant circuit 56 comprising inductance 56*a* and capacitor 56*b* is resonant to a different harmonic of the synchronizing pulse repetition rate and by way of example is selected to be resonant at the second harmonic thereof or 31,500 C. P. S. The waveform developed across tuned circuit 56 is shown in curve 4*e* of Figure 4. The voltage then appearing for rectification at the anode 66 of the diode 68 will be a complex waveform resulting from the addition of 63,000 C. P. S. waveform 4*d* and the 31,500 C. P. S. 4*e*. The use of this circuit has two advantages: First, it provides approximately twice as much peak voltage output for a given input voltage from the clipper-limiter circuit and consequently will provide greater sensitivity of control for a given set of other circuit conditions. Secondly, it provides a greater signal-to-noise ratio at the diode-anode 66 because it doubles the useful signal whereas the noise is increased by only $\sqrt{2}$. Further improvement could be obtained by using still more tuned circuits to select more harmonics of the sync pulse. However, in the practice of the present invention excellent performance may be obtained through the use of only one tuned circuit as shown in Figure 1.

The system of automatic gain control operation set forth in the present invention provides an inherently fast-acting correction for changes in signal strength by permitting the use of low values of time constant in the circuits handling the AGC potential. For instance, in Figure 1, the effective time constant of the filter circuit comprising capacitor 82, resistor 84 and capacitor 86 may be only about 0.1 of a vertical field or .0017 second. As before brought out this filtering is adequate to substantially remove any small irregularities in the output voltage which may occur due to the change in the 63,000 cycle ringing component, during the vertical blanking period, but still provides correction for signal strength variations in the received signal which may occur as often as 100 to 200 times per second. It is clear that although the time constant in the protective integrating network comprising resistor 170 and condenser 172 is relatively short having such values as .0035 second or .05 vertical field, which is too short to smooth out the effect of the vertical pulse, this circuit is not normally operative to control the receiver gain and hence in no way affects the normal operating speed of the AGC system.

It is to be appreciated that the practice of the present invention is in no way limited to the specific circuitry, operating potentials and parametric characteristics set forth by the arrangement in Figure 1 and/or that portion of the specification dealing therewith. For example, if the resistors 102 and 104 were removed and the resistor 110 connected directly to the plate 92 of tube 90, a positive potential would be applied to the AGC terminal 20, as derived from the +B supply 96. Such a positive potential could then be used as a gain control bias for the appropriate tubes in block 10, provided their cathodes were operated at a suitably high positive potential. Other workable arrangements relative to this aspect of practicing the invention as well as other obvious equivalent measures pertinent to other phases of its practice will, of course, automatically suggest themselves to those skilled in the art without however departing from the spirit of the present invention.

From the foregoing, it may be seen that the present invention forms a simple, economical and effective tuned type of AGC circuit which has an inherently high degree of noise immunity and allows adequate gain control sensitivity with a minimum number of circuit elements.

I claim as my invention:

1. In a radio receiving system for receiving and demodulating a radio carrier modulated by a composite wave including a periodically recurrent synchronizing component representing a fixed percentage of radio carrier modulation, an automatic gain control system comprising in combination: frequency sensitive means having an input circuit and an output circuit, a unilateral conduction device connected to the output circuit of said frequency sensitive means for developing a unidirectional voltage substantially in accordance with a predetermined harmonic energy content of an applied wave, an amplitude discriminatory wave communicating circuit having an input and an output and active to pass only those portions of an applied wave established above a datum amplitude level, means applying demodulated composite signal to the input of said wave communicating circuit with such amplitude that under normal reception of a fixed intensity radio carrier only a portion of said composite wave synchronizing component is established above said datum amplitude level, a coupling from the output of said discriminatory wave communicating circuit to the input of said frequency sensitive means such that the output voltage of said frequency sensitive means becomes a function of the harmonic energy content of that portion of the composite wave passed by said wave communicating circuit, means coupled with said unilateral conduction device for controlling the gain of said receiving circuit in response to the voltage output of said unilateral conduction device, means responsive to the received radio carrier for establishing a correcting control potential conditionally upon the application of input signals to said discriminatory circuit in excess of a given amplitude, and means coupling said correcting control potential to the input of said gain controlling means such as to suspend control of said frequency sensitive means over the gain of said receiving circuit for values of input signals to said discriminatory circuit in excess of said given amplitude.

2. In a television radio receiving system for receiving and demodulating a radio carrier modulated by a composite image signal including a periodically recurrent reference component and a periodically recurrent synchronizing component, each component representing respectively fixed percentages of radio carrier modulation, a frequency discriminatory device having an input circuit and an output circuit, said device being productive in its output circuit of an alternating voltage of an amplitude which is substantially a sole and positive function of that input energy bearing a harmonic relationship to the periodic recurrence frequency of said image signal synchronizing component, an amplitude discriminatory wave communicating circuit active to pass only those portions of applied waves established between an upper and lower datum amplitude level, means applying the demodulated composite signal to the input of said amplitude discriminatory wave communicating circuit the amplitude of the composite signal so applied being nominally adjusted relative to said amplitude discriminatory circuit datum levels such that for reception of radio carrier signal strengths of intermediate value the peak of demodulated synchronizing component is established above the lower datum amplitude level but below the upper datum amplitude level, a coupling from the output of said amplitude discriminatory circuit to the input of said frequency discriminatory device, a unilateral conduction device having at least an input and an output terminal, means coupling the output of said frequency discriminatory device to said unilateral conduction device input terminal, a load circuit connected to the output terminal of said unilateral conduction device for development of a unidirectional output control voltage in accordance with the amplitude of voltage waves applied to said unilateral conduction device input terminal, means connected with said load circuit for controlling the gain of said receiver in accordance with the control voltage developed in said load circuit, means responsive to the received radio carrier for establishing a correcting control voltage potential conditionally upon the application of input signals to said discriminatory circuit having an amplitude in excess of a predetermined level, and means coupling said correcting control potential to the input of said gain controlling means for suspending control of said frequency sensitive means over the gain of said receiving circuit for values of input signals to said amplitude discriminatory circuit in excess of said predetermined amplitude level.

3. In a television radio receiving system for receiving and demodulating a radio carrier modulated by a composite image signal including a periodically recurrent synchronizing component representing a fixed percentage of radio carrier modulation, a frequency discriminatory device having an input circuit and an output circuit, said device being productive in its output circuit of an alternating voltage of an amplitude which is substantially a sole and positive function of that input energy bearing a harmonic relationship with the periodic recurrence frequency of said image signal synchronizing component, an amplitude discriminatory wave communicating circuit having an input and an output and active to pass only those portions of applied waves established between an upper and lower datum amplitude level, means applying the demodulated composite signal to the input of said amplitude discriminatory wave communicating circuit, the amplitude of the composite signal so applied being nominally adjusted relative to said amplitude discriminatory circuit datum levels such that for reception of radio carrier signal strengths of intermediate value the peak of demodulated synchronizing component is established above the lower datum amplitude level but below the upper datum amplitude level, a coupling from the output of said amplitude discriminatory circuit to the input of said frequency discriminatory device, a unilateral conduction device having at least an input and an output terminal, means coupling the output of said frequency discriminatory device to said unilateral conduction device input terminal, a load circuit connected with the output terminal of said unilateral conduction device for development of a unidirectional output control voltage in accordance with the amplitude of voltage waves applied to said unilateral conduction device input terminal, gain controlling means having an input connected to said load circuit for controlling the gain of said receiver in accordance with the control voltage developed in said load circuit, means responsive to the output signal of said amplitude discriminatory wave communicating circuit for establishing a correcting control potential, and means coupling said correcting control potential to the input of said gain controlling means for suspending control of said frequency sensitive means over the gain of said receiving circuit for values of input signals to said amplitude discriminatory circuit in excess of a predetermined amplitude level.

4. In a television radio receiving system for receiving and demodulating a radio carrier modulated by a composite image signal including a periodically recurrent synchronizing component representing a fixed percentage of radio carrier modulation, an automatic gain control system comprising in combination a frequency discriminatory device having an input circuit and an output circuit said device being productive in its output circuit of an alternating voltage of an amplitude which is substantially a sole and positive function of that input energy bearing a harmonic relationship with the periodic recurrence frequency of said image signal synchronizing component, an amplitude discriminatory wave communicating circuit having an input and an output and active to pass only those portions of applied waves established between an upper and lower datum amplitude level, means applying the demodulated composite signal to the input of said amplitude discriminatory wave communicating circuit, the amplitude of the composite signal so applied being nominally adjusted relative to said amplitude discriminatory circuit datum level so that for reception of radio carrier signal strengths of intermediate value the peak of demodulated synchronizing component is established above the lower datum amplitude level but below the upper datum amplitude level, a coupling from the output of said amplitude discriminatory circuit to the input of said frequency discriminatory device, a unilateral conduction device having at least an input and an output terminal, means coupling the output of said frequency discriminatory device to said unilateral conduction device input terminal, a load circuit connected with the output terminal of said unilateral conduction device for development of a unidirectional output control voltage in accordance with the amplitude of voltage waves applied to said unilateral conduction device input terminal, means connected with said load circuit for controlling the gain of said receiver in accordance with the control voltage developed in said load circuit, a low pass integrating network connected with output of said amplitude discriminatory circuit for developing a voltage wave in accordance with signal energy communicated by said amplitude discriminatory circuit, a rectifier having at least an input terminal and an output terminal, a connection from said integrating network to said rectifier input terminal for applying thereto the alternating voltage wave developed by said integrating network, a connection from said rectifier output terminal to a load circuit for developing a unidirectional correcting control potential in accordance with the peak amplitude of said integrating network alternating voltage wave, and means coupling said correcting control potential with said unilateral conduction device so as to suspend control of said frequency sensitive means over the gain of said receiving circuit for values of applied input signals to said discriminatory circuit having amplitudes in excess of a predetermined amplitude level.

5. In a television radio receiving system for receiving and demodulating a radio carrier modulated by a composite image signal including a periodically recurrent reference component and a periodically recurrent synchronizing component each component representing respectively fixed percentages of radio carrier modulation, a frequency discriminatory device having an input circuit and an output circuit, said device being productive in its output circuit of an alternating voltage of an amplitude which is substantially a sole and positive function of input energy bearing a harmonic relationship with the periodic recurrence frequency of said image signal synchronizing component, an amplitude discriminatory wave communicating circuit having an input and an output and active to pass only those portions of applied waves established between an upper and lower datum amplitude level, means applying the demodulated composite signal to the input of said amplitude discriminatory wave communicating circuit, the amplitude of the composite signal so applied being nominally adjusted relative to said amplitude discriminatory circuit datum levels such that for reception of radio carrier signal strengths of intermediate value the peak of demodulated synchronizing component is established above the lower datum amplitude level but below the upper datum amplitude level, a coupling from the output of said discriminatory circuit to the input of said frequency discriminatory device, a unilateral conduction device having at least an input and an output terminal, means coupling the output of said frequency discriminatory device to said unilateral conduction device input terminal, a load circuit connected with the output terminal of said unilateral conduction device for development of a unidirectional output control voltage in accordance with the peak amplitude of voltage waves applied to said unilateral conduction device input terminal, means connected with said load circuit for controlling the gain of said receiver in accordance with the control voltage developed in said load circuit, a low pass integrating network connected with the output of said amplitude discriminatory circuit for developing a voltage wave in accordance with signal energy communicated by said amplitude discriminatory circuit, a rectifier having at least an input terminal and an output terminal, a connection from said integrating network to said rectifier input terminal for applying thereto the voltage wave developed by said integrating network, a connection from said rectifier output terminal to a load circuit for developing a unidirectional correcting control potential in accordance with the peak amplitude of said integrating network voltage wave, and means coupling said correcting potential with the input of said gain controlling means for establishing control of the receiving gain upon the application of input signals to said amplitude discriminatory circuit having amplitudes in excess of a given predetermined amplitude level.

6. In a television radio receiving system for receiving and demodulating a radio carrier modulated by a composite image signal including a periodically recurrent reference component and a periodically recurrent synchronizing component each component representing respectively fixed percentages of radio carrier modulation, a frequency discriminatory device having an input circuit and an output circuit, said device being productive in its output circuit of an alternating voltage of an amplitude which is substantially a sole and positive function of input energy bearing a harmonic relationship with the periodic recurrence frequency of said image signal synchronizing component, an amplitude discriminatory wave communicating circuit having an input and an output and active to pass only those portions of applied waves established between an upper and lower datum amplitude level, means applying the demodulated composite signal to the input of said amplitude discriminatory wave communicating circuit, the amplitude of the composite signal so applied being nominally adjusted relative to said amplitude discriminatory circuit datum levels so that for reception of radio carrier signal strengths of intermediate value the peak of demodulated synchronizing component is established above the lower datum amplitude level but below the upper datum amplitude level, a coupling from the output of said amplitude discriminatory circuit to the input of said frequency discriminatory device, a unilateral conduction device having at least an input and an output terminal, means coupling the output of said frequency discriminatory device to said unilateral conduction device input terminal, a load circuit connected with the output terminal of said terminal of said unilateral conduction device for development of a unidirectional output control voltage in accordance with the peak amplitude of voltage waves applied to said unilateral conduction device input terminal, means connected with said load circuit for controlling the gain of said receiver in accordance with the control voltage developed in said load circuit, a low pass integrating network connected with the output of said amplitude discriminatory circuit for developing a voltage wave in accordance with signal energy communicated by said amplitude discriminatory circuit, a rectifier having at least an input terminal and an output terminal, a connection from said integrating network to said rectifier input terminal for applying thereto the alternating voltage wave developed by said integrating network, and a connection from said rectifier output terminal and said unilateral conducting device load circuit for altering the value of control voltage developed therein only upon the application of input signals to said amplitude discriminatory circuit having amplitudes in excess of a predetermined amplitude level.

7. In a television radio receiving system for receiving and demodulating a radio carrier modulated by a composite image signal including a periodically recurrent synchronizing component representing a fixed percentage of radio carrier modulation, a frequency discriminatory device having an input circuit and an output circuit, said device being productive in its output circuit of an alternating voltage having an amplitude which is substantially a sole and positive function of input energy bearing a predetermined harmonic relationship with the periodic recurrence frequency of said image signal synchronizing component, an amplitude discriminatory wave communicating circuit having an input and an output and active to pass only those portions of applied waves established between an upper and lower datum amplitude level, means applying the demodulated composite signal to the input of said amplitude discriminatory wave communicating circuit, the amplitude of the composite signal so applied being nominally adjusted relative to said amplitude discriminatory circuit datum levels so that for reception of radio carrier signal strengths of intermediate value the peak amplitude of demodulated synchronizing component is established above the lower datum amplitude level but below the upper datum amplitude level, a coupling from the output of said amplitude discriminatory circuit to the input of said frequency discriminatory device, a unilateral conduction device having at least an input and an output terminal, means coupling the output of said frequency discriminatory device to said unilateral conduction device input terminal, a load circuit connected to the output terminal of said unilateral conduction device for development of a unidirectional output control voltage in accordance with the peak excursions of said unilateral device input alternating voltage having amplitudes in excess of a predetermined conduction threshold, means connected with said load circuit for controlling the gain of said receiver in accordance with the control voltage developed in said load circuit, means responsive to the output signal of said amplitude discriminatory wave communicating circuit for establishing a correcting control voltage, and means coupling said correcting control potential to the input of said gain controlling means for suspending control of said frequency sensitive means over the gain of said receiving circuit for values of input signals to said discriminatory circuit in excess of a predetermined amplitude level.

ALDA V. BEDFORD.

REFERENCES CITED

The following references are of record in the file of this patent:

UNITED STATES PATENTS

| Number | Name | Date |
|---|---|---|
| 2,135,561 | Connell | Nov. 8, 1938 |
| 2,251,929 | Freeman et al. | Aug. 12, 1941 |
| 2,303,184 | Wheeler | Nov. 24, 1942 |
| 2,356,141 | Applegarth | Aug. 22, 1944 |
| 2,416,424 | Wilson | Feb. 25, 1947 |
| 2,416,895 | Bartelink | Mar. 4, 1947 |
| 2,421,136 | Wheeler | May 27, 1947 |
| 2,538,028 | Mozley | Jan. 16, 1951 |

FOREIGN PATENTS

| Number | Country | Date |
|---|---|---|
| 848,207 | France | Oct. 25, 1939 |